United States Patent
Maselli et al.

(10) Patent No.: US 11,341,507 B2
(45) Date of Patent: May 24, 2022

(54) COMPLIANCE DOCUMENT CREATION, MODIFICATION, AND PROVISIONING

(71) Applicant: Avalara, Inc., Seattle, WA (US)

(72) Inventors: Michael J. Maselli, Cary, NC (US); Andrew Brandon Chan, Cary, NC (US)

(73) Assignee: Avalara, Inc., Seattle, WA (US)

( * ) Notice: Subject to any disclaimer, the term of this patent is extended or adjusted under 35 U.S.C. 154(b) by 762 days.

(21) Appl. No.: 15/458,622

(22) Filed: Mar. 14, 2017

(65) Prior Publication Data

US 2018/0268420 A1    Sep. 20, 2018

(51) Int. Cl.
*G06Q 50/18* (2012.01)
*G06Q 10/10* (2012.01)
(Continued)

(52) U.S. Cl.
CPC ........... *G06Q 30/018* (2013.01); *G06Q 10/06* (2013.01); *G06Q 10/10* (2013.01); *G06Q 50/18* (2013.01)

(58) Field of Classification Search
None
See application file for complete search history.

(56) References Cited

U.S. PATENT DOCUMENTS 6,873,992 B1 * 3/2005 Thomas ................. G06Q 10/10
7,769,712 B2   8/2010 Waldo et al.
(Continued)

FOREIGN PATENT DOCUMENTS

| WO | 01/41096 A1 | 6/2001 |
|---|---|---|
| WO | 2006/036991 A2 | 4/2006 |
| WO | 2007/019169 A2 | 2/2007 |

OTHER PUBLICATIONS

International Search Report and Written Opinion, dated May 22, 2018, for International Application No. PCT/US2018/022499, 15 pages.

(Continued)

*Primary Examiner* — Jan P Mincarelli
(74) *Attorney, Agent, or Firm* — Seed IP Law Group LLP

(57) ABSTRACT

Techniques are provided for facilitating creation, modification, provisioning and transfer of trusted electronic compliance documents. For each of multiple user requests to provide or receive trusted electronic compliance documents, automated operations are performed to determine whether the request is directed to one of a plurality of maintained trusted electronic compliance documents. Each trusted electronic compliance document references information regarding parties to a potential transaction and confers at least partial eligibility for parties to participate in the potential transaction. When it is determined that the request is directed to a maintained trusted electronic compliance document, access to the indicated trusted electronic compliance document is provided, including modifying a copy of the indicated trusted electronic compliance document to include information referenced with respect to an entity associated with the user request and an originator of the trusted electronic compliance document. A secure interface is provided for creating an indicated compliance document when it is determined that the request is not directed to a maintained compliance document.

11 Claims, 4 Drawing Sheets

(51) Int. Cl.
*G06Q 30/00* (2012.01)
*G06Q 10/06* (2012.01)

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,396,838 B2 | 3/2013 | Brockway et al. | |
| 8,583,705 B2 | 11/2013 | Foygel et al. | |
| 8,620,578 B1 | 12/2013 | Brown et al. | |
| 8,725,407 B2 | 5/2014 | Hurley et al. | |
| 9,070,103 B2 | 6/2015 | Kemp | |
| 9,076,176 B2 * | 7/2015 | Fosback | G06Q 30/0603 |
| 9,253,176 B2 | 2/2016 | Ford et al. | |
| 10,445,818 B1 | 10/2019 | Chowdhary | |
| 10,769,611 B2 | 9/2020 | McNeel | |
| 2003/0233286 A1 * | 12/2003 | Hahn-Carlson | G06Q 30/0283 |
| | | | 705/317 |
| 2004/0158612 A1 | 8/2004 | Concannon | |
| 2006/0085403 A1 | 4/2006 | Harrison et al. | |
| 2006/0218016 A1 | 9/2006 | Hohn et al. | |
| 2008/0235223 A1 | 9/2008 | Douglas et al. | |
| 2009/0031216 A1 | 1/2009 | Dressel et al. | |
| 2011/0179110 A1 * | 7/2011 | Soloway | G06Q 10/06 |
| | | | 709/203 |
| 2014/0279604 A1 | 9/2014 | Chavez | |
| 2015/0106279 A1 | 4/2015 | Gajendragadkar et al. | |
| 2015/0220649 A1 * | 8/2015 | Papa | G06F 16/93 |
| | | | 707/722 |
| 2016/0232536 A1 | 8/2016 | Couser et al. | |
| 2016/0292789 A1 | 10/2016 | Rajagopalan et al. | |

OTHER PUBLICATIONS

International Preliminary Report on Patentability for PCT/US2018/022499, dated Sep. 26, 2019. 11 pages.

Svirskas et al., "Compliance Proofs for Collaborative Interactions using Aspect-Oriented Approach," *2007 IEEE Congress on Services*, Salt Lake City, UT, Jul. 2007, 8 pages.

* cited by examiner

COMPLIANCE DOCUMENT CREATION, MODIFICATION, AND PROVISIONING

BACKGROUND

This disclosure generally relates to automated operations that facilitate the creation, modification, and provisioning of electronic documents, including trusted electronic documents that represent compliance with one or more regulations or policies.

Interactions by and between business entities and consumers, both in relation to other such entities and in relation to individuals, are often enhanced and/or enabled by the ability to certify various aspects of compliance with governmental or other regulations and policies. Typically, the certification of such compliance is accomplished by the creation of one or more physical compliance documents printed on paper, or stored and/or transmitted electronically but in an unsecured manner. However, obtaining, storing, creating and transferring such compliance documents is often a cumbersome problem that has not entirely been overcome by advances in computer and networking technology.

Accordingly, it is advantageous to provide a method and system to utilize techniques for the automated facilitation of such interactions, as well as computer-readable media that can configure and cause one or more computing systems to perform such techniques.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

SUMMARY

Techniques are provided for facilitating creation, modification, provisioning and transfer of trusted electronic compliance documents. For each of multiple user requests to provide or receive trusted electronic compliance documents, automated operations are performed to determine whether the request is directed to one of a plurality of maintained trusted electronic compliance documents. Each trusted electronic compliance document references information regarding parties to a potential transaction and confers at least partial eligibility for parties to participate in the potential transaction. When it is determined that the request is directed to a maintained trusted electronic compliance document, access to the indicated trusted electronic compliance document is provided, including modifying a copy of the indicated trusted electronic compliance document to include information referenced with respect to an entity associated with the user request and an originator of the trusted electronic compliance document. A secure interface is provided for creating an indicated trusted electronic compliance document when it is determined that the request is not directed to a maintained trusted electronic compliance document.

Additional features and advantages are realized through various techniques described in greater detail herein and in the accompanying drawings.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

A system for providing a document provisioning service may be summarized as including a compliance member database component that, in operation, maintains data regarding trusted electronic compliance document originators; a trusted electronic compliance document database that, in operation, maintains on behalf of the trusted electronic compliance document originators a plurality of trusted electronic compliance documents that include information associated with parties to transactions and potential transactions; a trusted electronic compliance document creation portal that is communicatively coupled to the compliance member database component and to the trusted electronic compliance document database and that, in operation, facilitates creation of at least some of the plurality of trusted electronic compliance documents by at least some trusted electronic compliance document originators, wherein a given trusted electronic compliance document references information regarding one or more parties to a potential transaction and confers at least partial eligibility to participate in the potential transaction for at least one of the one or more parties; a trusted electronic compliance document request manager that is communicatively coupled to the trusted electronic compliance document database and that, in operation, receives a user request for an indicated trusted electronic compliance document and determines whether the user request is directed to one or more of the maintained plurality of trusted electronic compliance documents; and a trusted electronic compliance document generator that is communicatively coupled to the trusted electronic compliance document request manager and that in operation, when it is determined that the indicated trusted electronic compliance document is one of the maintained plurality of trusted electronic compliance documents, provides access to the indicated trusted electronic compliance document in response to the received user request, wherein providing access to the indicated trusted electronic compliance document includes modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document; wherein, in operation, the trusted electronic compliance document request manager provides, when it is determined that the user request is not directed to one or more of the maintained plurality of trusted electronic compliance documents, a secure interface for creation of the indicated trusted electronic compliance document via the trusted electronic compliance document creation portal. Providing the secure interface for creation of the indicated trusted electronic compliance document may include transmitting an electronic invitation over one or more computer networks to one or more trusted electronic compliance document originators for use of the trusted electronic compliance document creation portal.

The secure interface for creation of the indicated trusted electronic compliance document may further include, after transmitting the electronic invitation to the one or more trusted electronic compliance document originators, receiving information that at least partially defines the indicated trusted electronic compliance document from at least one of the one or more trusted electronic compliance document originators. The information that may at least partially define the indicated trusted electronic compliance document includes an image file. Receiving the information that at least partially defines the indicated trusted electronic compliance document may include receiving the information that at least partially defines the indicated trusted electronic compliance document via a software application that is associated with the document provisioning service and that is executing on a client computing device of the one or more trusted electronic compliance document originators. The indicated trusted electronic compliance document may be one of a group that includes a tax exemption certificate, a tax withholding form (e.g., a federal "W-8," "W-9," or "1099" form within the United States, or similar form for other jurisdictions), an excise license, a business license, and a certificate of insurance. In certain embodiments, the user request may be received by the trusted electronic compliance document request manager via a software application executing on a client computing device of a user associated with the user request; in one or more embodiments, such user requests may also be received via other digital or physical correspondence (e.g., email, postal mail, facsimile transmission, etc.).

Providing access to the indicated trusted electronic compliance document may further include determining whether the modified copy of the indicated trusted electronic compliance document is completed and, when it is determined that the modified copy of the indicated trusted electronic compliance document is completed, forwarding the modified copy of the indicated trusted electronic compliance document to one or more entities associated with the potential transaction.

A computer-implemented method may be summarized as including receiving, by one or more configured computing systems of a document provisioning service, multiple user requests that each indicate a trusted electronic compliance document, each trusted electronic compliance document referencing information regarding one or more parties to a potential transaction and conferring at least partial eligibility to participate in the potential transaction for at least one of the one or more parties; and responding, by the one or more configured computing systems, to each of at least some of the multiple user requests by: determining whether the user request is directed to one of a plurality of trusted electronic compliance documents maintained by the document provisioning service; when it is determined that the user request is directed to one of the plurality of trusted electronic compliance documents maintained by the document provisioning service, providing access to the indicated trusted electronic compliance document, wherein providing access to the indicated trusted electronic compliance document includes modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document; and when it is determined that the user request is not directed to one of the plurality of trusted electronic compliance documents maintained by the document provisioning service, providing a secure interface for creation of the indicated trusted electronic compliance document by one or more trusted electronic compliance document originators.

The computer-implemented method may further include maintaining information regarding multiple users of the document provisioning service, and wherein modifying a copy of the indicated trusted electronic compliance document includes modifying the copy of the indicated trusted electronic compliance document to include information regarding at least one of the multiple users that is associated with the received user request.

The computer-implemented method may further include maintaining information regarding multiple trusted electronic compliance document originators that are associated with the plurality of maintained trusted electronic compliance documents, and wherein modifying a copy of the indicated trusted electronic compliance document includes modifying the copy of the indicated trusted electronic compliance document to include information regarding at least one of the multiple trusted electronic compliance document originators that is associated with the indicated trusted electronic compliance document. Providing the secure interface for creation of the indicated trusted electronic compliance document by the one or more trusted electronic compliance document originators may include transmitting an electronic invitation over one or more computer networks to the one or more trusted electronic compliance document originators for use of a trusted electronic compliance document creation portal provided by the document provisioning service.

The computer-implemented method may further include, after transmitting the electronic invitation to the one or more trusted electronic compliance document originators, receiving information defining the indicated trusted electronic compliance document from at least one of the one or more trusted electronic compliance document originators. Receiving the information defining the indicated trusted electronic compliance document may include receiving an image file that represents one or more documents issued by an entity to certify compliance with one or more regulations. At least one trusted electronic compliance document indicated by at least one of the received user requests may be one of a group that includes a tax exemption certificate, a tax withholding form, an excise license, a business license, and a certificate of insurance. At least one of the user requests may be received via a software application that is associated with the document provisioning service and that is executing on a client computing device of a user initiating the user request.

Providing access to the indicated trusted electronic compliance document may further include determining whether the modified copy of the indicated trusted electronic compliance document is completed and, when it is determined that the modified copy of the indicated trusted electronic compliance document is completed, forwarding the modified copy of the indicated trusted electronic compliance document to one or more entities associated with the potential transaction. At least one of the user requests may be received via a Web server provided by the document provisioning service.

The computer-implemented method may further include, for at least one of the multiple user requests and prior to receiving the at least one user request: receiving an additional user request specifying one or more trusted electronic compliance document originators; and responsive to receiving the additional user request, providing information regarding one or more trusted electronic compliance documents maintained by the document provisioning service that are associated with the specified one or more trusted electronic compliance document originators.

A non-transitory computer-readable storage medium having stored contents that configure one or more computing systems of a document provisioning service to perform a method may be summarized as including receiving, by the one or more configured computing systems, multiple user requests that each indicate a trusted electronic compliance document, each trusted electronic compliance document referencing information regarding one or more parties to a potential transaction and conferring at least partial eligibility to participate in the potential transaction for at least one of the one or more parties; and for each of at least some of the multiple user requests: determining whether the user request is directed to one of a plurality of trusted electronic compliance documents maintained by the document provisioning service; when it is determined that the user request is directed to one of the plurality of trusted electronic compliance documents maintained by the document provisioning service, modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document, and providing access to the modified copy of the indicated trusted electronic compliance document; and when it is determined that the user request is not directed to one of the plurality of trusted electronic compliance documents maintained by the document provisioning service, providing a secure interface for creation of the indicated trusted electronic compliance document by one or more trusted electronic compliance document originators.

The method may further include maintaining information regarding multiple users, and wherein modifying a copy of the indicated trusted electronic compliance document includes modifying the copy of the indicated trusted electronic compliance document to include information regarding a user associated with the received user request.

The method may further include maintaining information regarding multiple trusted electronic compliance document originators that are associated with the plurality of maintained trusted electronic compliance documents, and wherein modifying a copy of the indicated trusted electronic compliance document includes modifying the copy of the indicated trusted electronic compliance document to include information regarding a trusted electronic compliance document originator that is associated with the indicated trusted electronic compliance document. Providing the secure interface for creation of the indicated trusted electronic compliance document by the one or more trusted electronic compliance document originators may include transmitting an electronic invitation over one or more computer networks to the one or more trusted electronic compliance document originators for use of a trusted electronic compliance document creation portal provided by the document provisioning service.

The method may further include, after transmitting the electronic invitation to the one or more trusted electronic compliance document originators, receiving information that at least partially defines the indicated trusted electronic compliance document from at least one of the one or more trusted electronic compliance document originators. The information that at least partially defines the indicated trusted electronic compliance document may include an image file that represents one or more documents issued by an entity to certify compliance with one or more governmental regulations. At least one of the indicated trusted electronic compliance documents may be one of a group that includes a tax exemption certificate, a tax withholding form, an excise license, a business license, and a certificate of insurance. For at least one of the user requests, receiving the user request may include receiving the user request via a software application that is associated with the document provisioning service and that is executing on a client computing device of a user associated with the user request.

Providing access to the indicated trusted electronic compliance document may further include determining whether the modified copy of the indicated trusted electronic compliance document is completed and, when it is determined that the modified copy of the indicated trusted electronic compliance document is completed, forwarding the modified copy of the indicated trusted electronic compliance document to one or more entities associated with the potential transaction.

A system may be summarized as including one or more processors; and at least one memory, the memory including instructions that, upon execution by at least one of the one or more processors, cause the system to: receive from a user an indication of a trusted electronic compliance document, the indicated trusted electronic compliance document referencing information regarding one or more parties to a potential transaction and imparting at least partial eligibility to participate in the potential transaction to at least one of the one or more parties; generate a request for the indicated trusted electronic compliance document; provide, via a programmatic interface communicatively coupled to a trusted electronic compliance document source, the generated request for the indicated trusted electronic compliance document; after receiving a copy of the indicated trusted electronic compliance document from the trusted electronic compliance document source, modify the copy of the indicated trusted electronic compliance document based at least in part on data maintained by a compliance provisioning service to include at least some of the referenced information regarding the one or more parties to the potential transaction; and provide access to the modified copy of the trusted electronic compliance document to the user.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
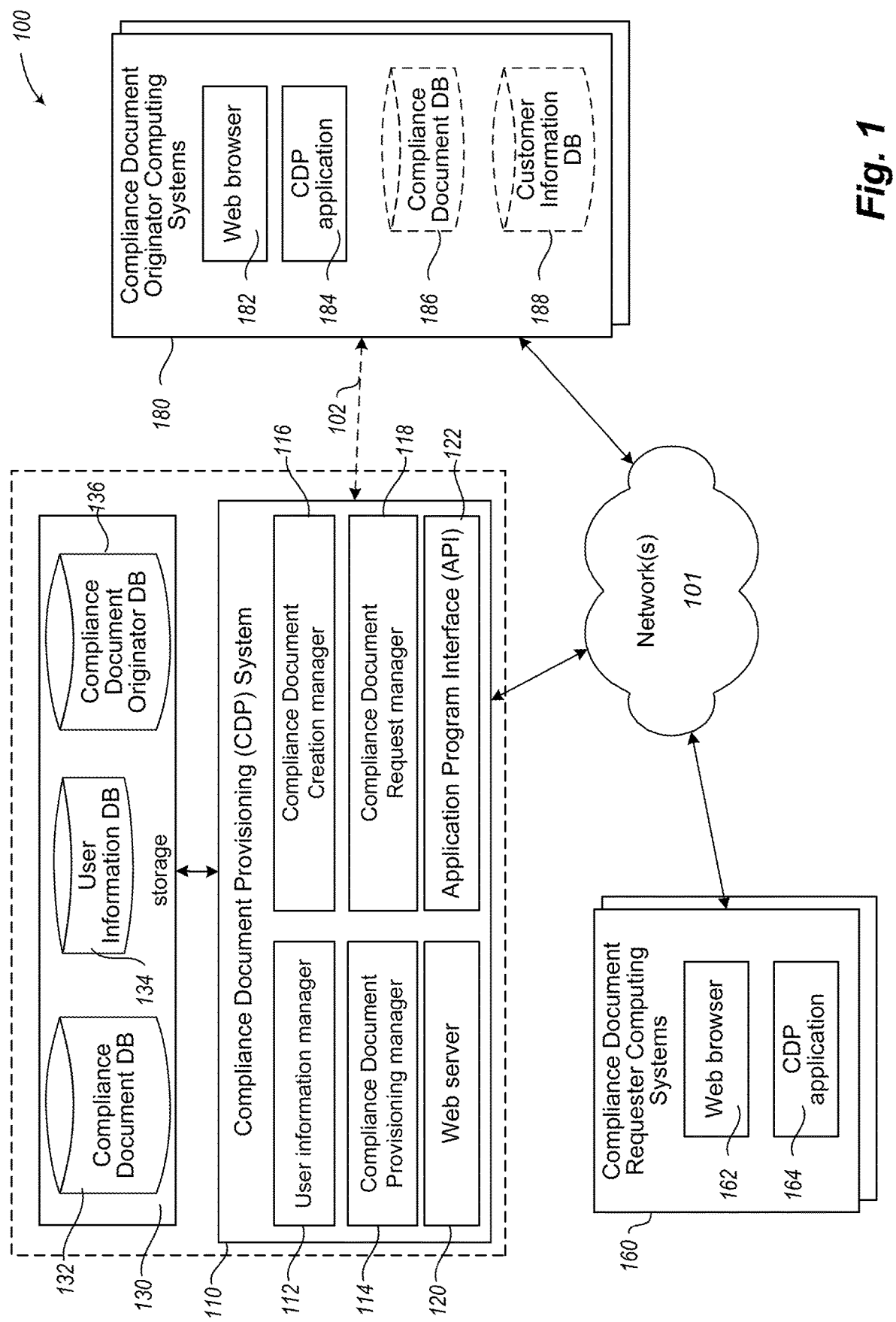
FIG. 1 depicts a block diagram of an exemplary network environment and computing system in accordance with an embodiment of techniques described herein.

One or more embodiments described herein enable one or more processor-based computing systems to perform automated operations to facilitate the creation, modification, storage, provisioning, and transfer of trusted electronic compliance documents. In this manner, the described techniques may simplify interactions related to trusted electronic compliance documents by both trusted electronic compliance document originators and trusted electronic compliance document requesters, such as by enabling the automated provision of information required for the completion of one or more trusted electronic compliance documents, as well as additional operations detailed elsewhere herein. In at least certain embodiments, some or all of the techniques may be performed by one or more computing systems operating as a Compliance Document Provisioning ("CDP") system. Moreover, functionality described herein with respect to such a CDP system may be provided by one or more networked computing systems, such networked computing systems operated by one or both of a document provisioning service provider operating the CDP system and a local client application associated with the CDP system but executing on client devices of its users.

As one non-exclusive example of interactions facilitated by a CDP system or other embodiment of techniques described herein, assume that a building contractor is a customer of a local hardware retailer. The contractor wishes to purchase supplies from the retailer in a tax-exempt manner, which is a transaction for which the contractor is eligible only when the contractor provides information referenced by a certain tax exemption certificate. The tax exemption certificate may later be used by the hardware retailer for tax documentation purposes. In this example, the hardware retailer maintains a user account as a trusted electronic compliance document originator with the CDP system, which stores account and other information regarding the hardware retailer.

At the time of purchase, a clerk of the hardware retailer uses a client computing device communicatively connected to the CDP system in order to receive the requisite information from the building contractor, which may include a business entity name, taxation identification number, contact address, or similar identifying information. In this example, the hardware retailer may execute an application on the client computing device in order to facilitate the collection of such information, such as by using the client computing device (or attached accessory) to scan a driver's license or other identification provided by the contractor. In other scenarios, the CDP system may already store and maintain the requisite information associated with the contractor, such as if the contractor has previously requested tax-exempt status from other account holders of the CDP system or if the contractor has registered as an account holder himself. In such scenarios, the customer (i.e., the building contractor) may simply provide one or more uniquely identifying parameters to the retailer in order for the CDP system to retrieve the remaining requisite information. Such parameters might include, as non-limiting examples, a Social Security number; a tax identification number; a user account identifier; a driver's license number; a QR/barcode or other machine-readable graphical identifier; etc.

Upon receiving the requisite information via the client computing device of the hardware retailer, the CDP system provisions the requested tax exemption certificate in a trusted way for use with the proposed transaction for the hardware retailer and contractor. In particular, the CDP system may provision the tax exemption certificate by selecting and retrieving a base or "clean" tax exemption certificate from a database of the CDP system. For example, the CDP system may select and retrieve a version of the tax exemption certificate that is appropriate for the hardware retailer's geographical region, which references but does not include requisite entity-specific information for completing the tax exemption certificate. The CDP system then modifies a copy of the selected tax exemption certificate to include information referenced by the tax exemption certificate regarding the hardware retailer and regarding the contractor, and provides the modified copy to either or both parties. In certain embodiments and scenarios, the CDP system may associate a trusted electronic copy of the completed tax exemption certificate with the user account of the hardware retailer, such as to enable the retailer to retrieve the completed certificate at a later date, to include the contractor in one or more reports provided by the CDP system to satisfy a tax audit, or to print a physical copy of the trusted tax exemption certificate. Regardless of the manner in which the completed tax exemption certificate is provided by the CDP system, the contractor is now eligible to purchase the desired supplies from the hardware retailer in a tax-exempt manner.

In certain embodiments, the CDP system may maintain data and/or metadata regarding regulatory or other compliance information regarding multiple jurisdictions with respect to each of multiple document types, such as to associate appropriate compliance factors for each document type for each of the multiple jurisdictions. In certain scenarios, such compliance factors may indicate additional information required to complete a trusted electronic compliance document even when the trusted electronic compliance document itself does not expressly reference such information. As one non-limiting example, the CDP system may maintain information regarding jurisdictional limitations and requirements on parties seeking tax exemption in particular jurisdictions (such as particular reasons or classes for tax-exempt status allowed by each state within the United States).

As another independent example of interactions facilitated by a CDP system or other embodiment of techniques described herein, assume that a vendor performs contract work for multiple business entities. Rather than physically mailing original physical copies of a required "W-9" or other physical compliance document, the vendor may utilize his account with the CDP system to create the requisite trusted electronic compliance document. In the example of a "W-9," the trusted electronic compliance document references only information regarding the vendor itself, and does not reference information regarding another party. In such instance, the CDP system may then initiate the transmission of the completed trusted electronic compliance document to those entities identified as those for which the vendor has performed such contract work.

In at least some embodiments, the recipient of the trusted electronic compliance document transmitted in this manner may choose whether to accept or decline the transmitted trusted electronic compliance document. If the recipient entity accepts the transmitted trusted electronic compliance document but does not already have an account with the CDP system, then the recipient entity may elect to register for an account as part of accepting the transmitted trusted electronic compliance document, so that the CDP system may associate the accepted and other trusted electronic compliance documents with the account for future use. In certain embodiments, if such an entity does not exist as a user in the CDP system, the CDP system may separately determine to initiate an invitation to the entity to create a user account for the CDP system in order to maintain trusted electronic compliance documents corresponding to some or all of the entity's vendors using the CDP system, even if the recipient declines to accept the trusted electronic compliance document from the vendor attempting to send the trusted electronic compliance document. Moreover, in certain embodiments, the CDP system may initiate the sending of a trusted original physical copy of the requisite trusted electronic compliance document to any entities selected by the vendor that are not already CDP system account holders.

For trusted electronic compliance documents in which information pertaining to both the vendor and the recipient entity are referenced within the trusted electronic compliance document, in certain embodiments the CDP system may first determine to initiate a query to the recipient entity regarding whether they accept the trusted electronic compliance document, and only then to provision the trusted electronic compliance document by modifying a copy of the trusted electronic compliance document to include information regarding the recipient entity. In at least one embodiment, the determination of whether to initiate such a query may be based at least in part on one or more privacy settings associated with the recipient entity, such as whether the recipient entity has selected to "opt-out" of interactions not specifically requested or initiated by the recipient entity itself.

As used herein, the term "trusted electronic compliance document" refers to an electronic version of a document or data structure that, when completed in accordance with one or more governmental regulations or other policies, indicates and/or confers at least partial eligibility for one or more parties to conduct a transaction. A non-exclusive but exemplary list of typical trusted electronic compliance documents includes trusted electronic representations of tax exemption certificates, tax withholding forms, excise licenses, business licenses, and certificates of insurance.

The term "trusted electronic compliance document originator," also referred to herein as an "originator user" or simply "originator," refers to any individual or entity responsible for the creation or provision of one or more trusted electronic compliance documents to another individual or entity.

The term "trusted electronic compliance document requester," also referred to herein as a "requester user" or simply "requester," may refer to any individual or entity associated or potentially associated with a transaction (or potential transaction) for which one or more trusted electronic compliance documents may indicate or confer at least partial eligibility, but who is not responsible for the creation or provision of such trusted electronic compliance documents.

Reference herein to a "user" or "users" without further designation may include any individuals or entities interacting in various scenarios with an embodiment of the CDP system, and may include past, future or current such users.

As described herein, for simplicity, a user is in some cases described in the context of the male gender. For example, the terms "himself," his account," and the like are used. It is understood that a user can be of any gender, and the terms "he," "his," "him," and the like as used herein are to be interpreted broadly inclusive of all known gender definitions.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In at least some embodiments, individuals or entities may operate in various circumstances as either or both a trusted electronic compliance document originator and a trusted electronic compliance document requester. Consequently, reference herein to one entity or individual as an originator shall not be construed to prevent such an entity or individual from additionally being described as a requester (and vice versa) unless context clearly indicates otherwise. As one example, a retailer may act as a trusted electronic compliance document requester in order to receive a blank electronic tax exemption certificate from a government entity via the CDP system, and the retailer may subsequently operate as a trusted electronic compliance document originator in order to provide via the CDP system a trusted electronic tax exemption certificate to one or more of its customers—who, in turn, operates in this example as a trusted electronic compliance document requester. The CDP system may operate to modify the copy of the trusted electronic tax exemption certificate to include the existing information for that retailer, as well as modifying the copy to include information associated with additional requesters (e.g., customers attempting to make purchases from the retailer in a tax-exempt manner) in the future.

FIG. 1 is a schematic diagram of a networked environment 100 that includes a Compliance Document Provisioning ("CDP") system 110 as well as various computing systems associated with one or more trusted electronic compliance document originators and/or with one or more trusted electronic compliance document requester users of the CDP system. As indicated herein, in various scenarios, a user of the CDP system may operate at the same or different times as either or both of a trusted electronic compliance document originator and a trusted electronic compliance document requester. With respect to at least some embodiments discussed herein, the discussion may refer to aggregating types of information associated with trusted electronic compliance document originator users and trusted electronic compliance document requester users, but it will be appreciated that the same or similar techniques may be applied to other types of information and for other types of uses in other embodiments.

The illustrated example of FIG. 1 includes a number of trusted electronic compliance document requester computing systems 160 and a number of trusted electronic compliance document originator computing systems 180 that are each interacting at various times with the CDP system 110 via one or more intervening networks 101.

The interactions of requester computing systems 160, originator users 180, and other entities with the CDP system 110 may occur in various ways, such as in an interactive manner via one or more graphical user interfaces (not shown) that are provided by the CDP system 110 to those users and/or other entities via at least some Web pages of a CDP system Web site provided by Web server 120. In addition to or in conjunction with such interactions, interactions with the CDP system may occur in a programmatic manner by one or more client software applications via an Application Program Interface ("API") 122 provided by the CDP system 110 that allows computing systems and/or programs to invoke various functionality programmatically, such as using Web services or other network communication protocols. In the illustrated embodiment, various interactions between trusted electronic compliance document requester computing systems 160 and the CDP system 110 may be performed using either or both of a web browser 162 and a CDP application or "app" 164 executing on the computing system 160. Similarly, various interactions between trusted electronic compliance document originator computing systems 180 and the CDP system 110 may be performed using either or both of a web browser 182 and a CDP application 184 executing on the computing system 180. Each of the trusted electronic compliance document originator computing systems 180 and the trusted electronic compliance document requester computing systems 160 may comprise a fixed computing system or a mobile computing device, as detailed elsewhere herein.

In the illustrated embodiment, the CDP system 110 includes a user information manager component 112; a trusted electronic compliance document provisioning manager component 114; a trusted electronic compliance document creation manager component 116; and a trusted electronic compliance document request manager component 118. In addition, the CDP system includes the aforementioned Web server 120 and API 122, both of which may facilitate various interactions with any or all of the trusted electronic compliance document requester computing systems 160 and trusted electronic compliance document originator computing systems 180. The CDP system may be communicatively coupled to one or more storage components 130, which in the illustrated embodiment of FIG. 1 include trusted electronic compliance document DB 132, user information DB 134, and trusted electronic compliance document originator DB 136. In certain embodiments, storage components 130 may be operated by a third-party data storage service provider, such as may provide various cloud-based storage services; in other embodiments, storage components 130 may be integrated into the CDP system directly, and may be operated by a CDP service provider that operates the CDP system.

In situations in which the CDP system 110 provides one or more Web sites via Web servers 120, at least some originator users and requester users (not shown) may perform at least some interactions via such Web sites. For example, such users may use a client computing device (such as trusted electronic compliance document requester computing system 160 and/or trusted electronic compliance document originator computing system 180) to interact with the CDP system 110 over networks 101, such as to obtain Web pages or other electronic information pages (e.g., HTML-based emails, or other groups of information that are formatted at least in part based on HTML or other formats or markups) from the CDP system, and to optionally provide various information related to one or more trusted electronic compliance documents. Such users may access one or more Web sites provided by the CDP system to obtain one or more Web pages, such as to view information about, search for, browse for, and/or provide information related to trusted electronic compliance documents, trusted electronic compliance document requesters, and/or trusted electronic compliance document originators. In certain embodiments, the CDP system 110 may store various types of user information associated with such online interactions, including in some cases information about all interactions and activities performed by the user with respect to the CDP system 110.

In the depicted example of FIG. 1, the network 101 is a publicly accessible network of linked networks, possibly operated by various distinct parties, such as the Internet, although in other embodiments the network 101 may have other forms. For example, the network 101 may instead be a private network, such as a corporate or university network that is wholly or partially inaccessible to non-privileged users. In still other embodiments, the network 101 may cooperatively include both private and public networks, with one or more of the private networks having access to and/or from one or more of the public networks. Furthermore, the network 101 may include various types of wired and/or wireless networks in various situations. In addition, in this illustrated example of FIG. 1, users of the trusted electronic compliance document requester computing systems 160 and trusted electronic compliance document originator computing systems 180 may use such computing systems and/or other client devices (not shown) to interact with the CDP system 110 to obtain various described functionality via the network 101, and in doing so may provide various types of information to the CDP system 110. Moreover, in certain embodiments, the various users and providers of the networked environment 100 may interact with the CDP system 110 and/or one or more other users and providers using an optional private or dedicated connection, such as a dedicated connection 102, which is shown as optionally connecting one or more of the trusted electronic compliance document originator computing systems 180 and the CDP system 110. For example, a dedicated connection 102 may include one or more VPN (Virtual Private Network) connections.

Furthermore, the CDP system may in certain embodiments receive and provide various types of information from additional information provider computing systems, such as those that may be operated by government agencies, insurance providers, or other certifying authorities (not shown). Under certain situations and scenarios, the CDP system 110 may optionally retrieve various information from such information provider computing systems, such as one or more base (or "blank") trusted electronic compliance documents to utilize for or on behalf of users of the CDP system 110. In addition, in various scenarios the CDP system 110 may provide completed trusted electronic compliance documents to such information providers, such as to provide trusted evidence of compliance with regulations or policies promulgated by the information providers themselves or other entities.

In various embodiments and scenarios, interactions of trusted electronic compliance document requester users with the CDP system 110 may include a variety of activities related to trusted electronic compliance documents associated with the requester users themselves or with one or more trusted electronic compliance document originators. As non-limiting examples, such interactions may include receiving information associated with a trusted electronic compliance document requester user by the CDP system 110, such as for inclusion within one or more trusted electronic compliance documents; receiving and handling requests from the requester users, such as to identify trusted electronic compliance document originators associated with a desired trusted electronic compliance document based on specified criteria, to request a specified trusted electronic compliance document, or to receive information regarding trusted electronic compliance documents or trusted electronic compliance document originators satisfying criteria specified by the requester users; and other appropriate interactions.

Furthermore, in various embodiments and scenarios, interactions of trusted electronic compliance document originator users with the CDP system 110 may include a variety of activities related to trusted electronic compliance documents associated with those originator users themselves, or associated with one or more trusted electronic compliance document requesters. As non-limiting examples, such interactions may include receiving information associated with a trusted electronic compliance document requester user by the CDP system 110, such as for inclusion within one or more trusted electronic compliance documents; providing an indication of one or more requests received for a trusted electronic compliance document associated with the originator; providing invitations to create a requested trusted electronic compliance document associated with the originators; providing invitations to create a user account with the CDP system in order to create a requested trusted electronic compliance document on behalf of a requester user; providing information regarding trusted electronic compliance documents that may be useful or otherwise advantageous for the originator user based on criteria, preferences, or past interactions of the originator user with the CDP system; and other appropriate interactions. Furthermore, in various circumstances the CDP system may determine to initiate communications with originators based on aspects of trusted electronic compliance documents associated with those originators, such as if a trusted electronic compliance document indicates one or more time periods, expiration dates, or other time-sensitive characteristics associated with the trusted electronic compliance document. In such circumstances, the CDP system 110 may send reminders to the associated originator regarding the time-sensitive characteristics, including but not limited to reminders to update defining information for the trusted electronic compliance document or to provide an updated version.

In addition, the CDP system 110 may initiate various operations regarding either or both of the trusted electronic compliance document originator users and the trusted electronic compliance document requester users independent of interactions with those users themselves. Non-limiting examples of such operations include storage and analysis of information regarding such users for current and future use, including storing, tracking and analyzing information related to interactions by those users with the CDP system 110 or with other users; providing notifications to users of the CDP system 110 regarding trusted electronic compliance documents or trusted electronic compliance document originators that may be of interest to such users based on user characteristics, user preferences, user-provided criteria, or previous interactions with the CDP system 110; etc. In addition, in certain embodiments the CDP system 110 may provide estimates or other analysis regarding various aspects of transactions performed using trusted electronic compliance documents provided by or provisioned via the CDP system. For example, the CDP system 110 may provide one or more reports regarding the validity or invalidity of tax exemptions enabled by one or more tax exemption certificates transmitted between users of the CDP system.

In at least some embodiments, the CDP system may proactively identify and suggest one or more entities, including but not limited to originator and requester users, that particular users of the CDP system 110 may be interested in connecting with for purposes of trusted electronic compliance document provisioning and transfer. Similarly, the CDP system 110 may proactively identify and suggest particular trusted electronic compliance documents that may be relevant to particular originator and requester users. In order to identify and suggest such entities or trusted electronic compliance documents, the CDP system 110 may utilize predictive analytics based on data and documents stored in the CDP system 110, including tracked behavior and interactions of its users. As one non-limiting example, the CDP system 110 may determine to, based on a requester user's history of provisioning trusted electronic compliance documents to or from users in a particular geographical area and/or in particular industries, provide the requester user with a listing of additional users in neighboring geographical areas or in related industries. As another example, the CDP system 110 may provide a requester user with an indication of new trusted electronic compliance documents defined by originator users with which the requester user has previously interacted, and/or with an indication of new originator users that are associated with trusted electronic compliance documents similar to those that the user has previously requested. In certain embodiments, such analytics may include, as non-limiting examples: decision trees (such as Chi-Squared Automatic Interaction Detection or "CHAID" models to identify particular data components with predictive value); Ordinary Least Squares ("OLS") Regression models, such as Logit/Probit models or other such regression models, to predict a likelihood that particular parties may benefit from mutual interaction; neural networks, such as to describe the relationships and possible outcomes of interactions between users; and other techniques.

In various embodiments, the CDP system may maintain one or more secure modification ledgers (such as via a blockchain or other manner) to track all use, modification, and transfer of one or more of the trusted electronic compliance documents maintained by the CDP system. For example, the CDP system may create entries in one or more secure modification ledgers each time a trusted electronic compliance document is amended, stored, overwritten, transmitted, provisioned, or otherwise utilized. In this manner, all original or modified trusted electronic compliance documents provisioned or provided by the CDP system may be tracked over time. In one or more embodiments, a secure modification ledger may be maintained centrally (i.e., using one or more computing systems in a single location) or in a distributed manner (i.e., using multiple geographically dispersed computing systems) by the CDP system.

In certain embodiments, a customer or other user may be charged various fees in association with use of the CDP system, either on a transactional basis, a subscription basis, or both. As non-limiting examples, a CDP user may be charged one or more fees based on a quantity of trusted electronic compliance documents associated with the user's account; a quantity of trusted electronic compliance documents received by and/or transmitted by the user, either as a one-time fee for each such receipt and/or transmission or on a subscription basis; use of the CDP system to create or otherwise define a trusted electronic compliance document; etc.

Figure 2A:
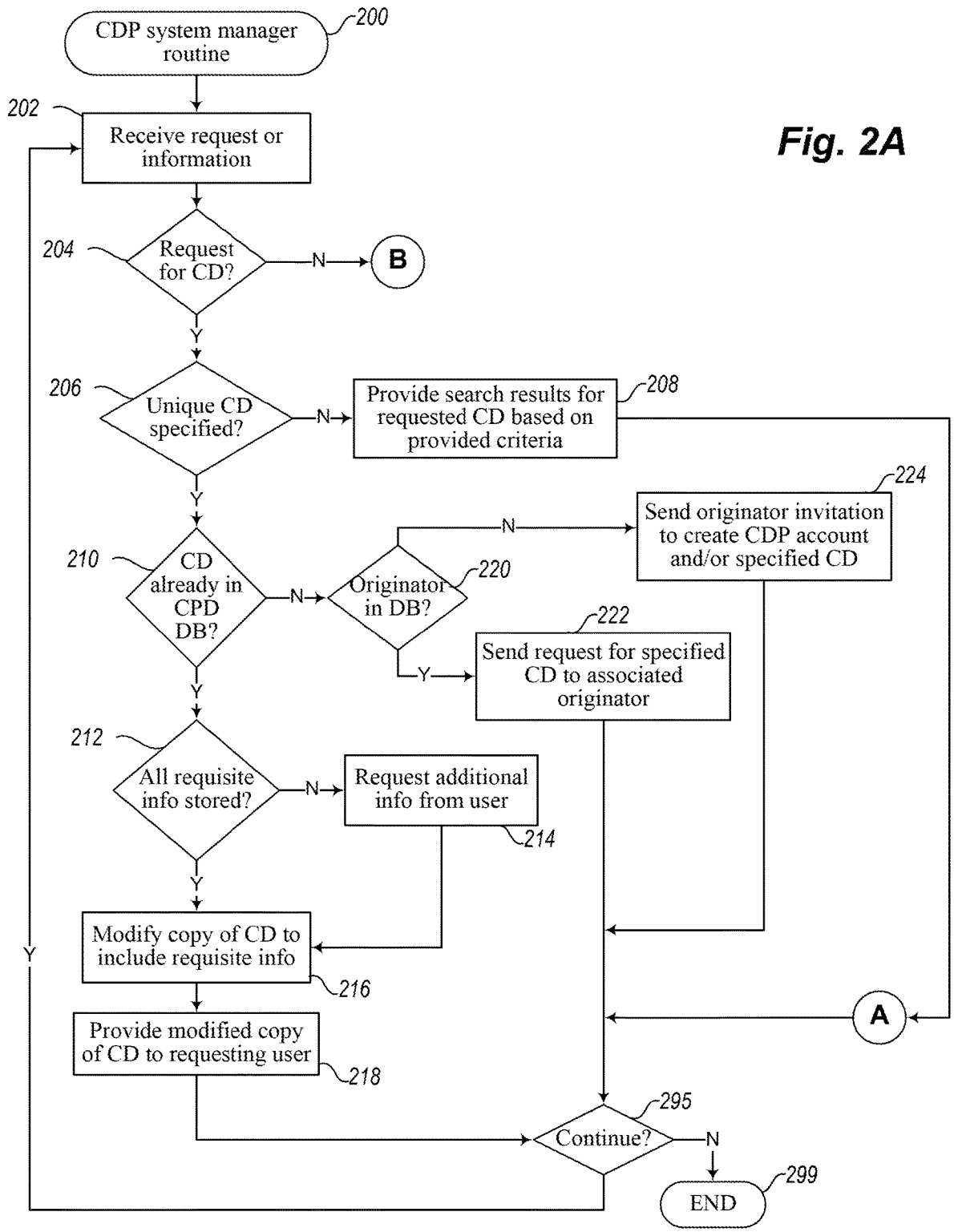
FIGS. 2A-2B depict a process flow for a Compliance Document Provisioning system in accordance with an embodiment of techniques described herein.
Figure 2B:
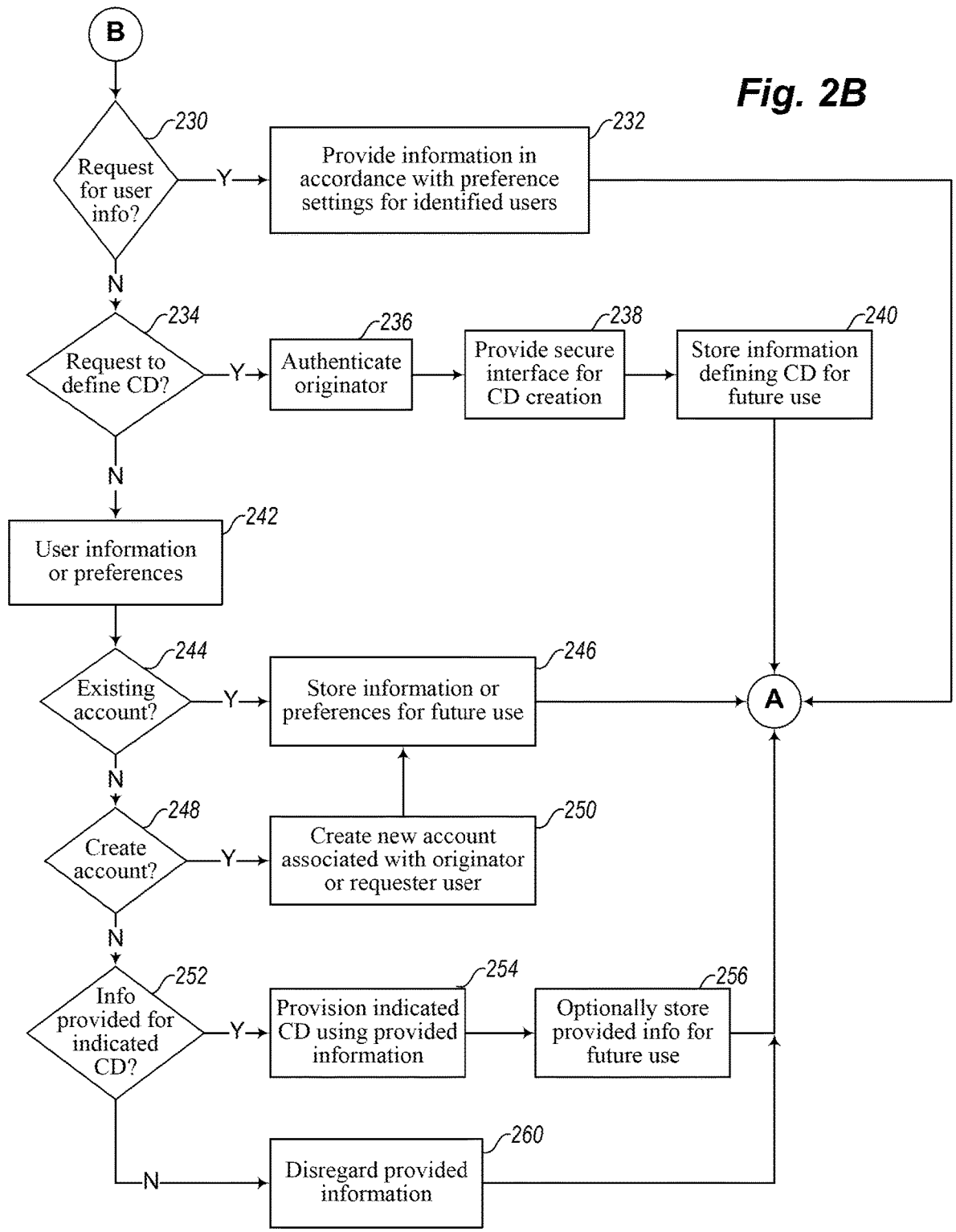

FIGS. 2A-2B depict a process flow for a Compliance Document Provisioning system manager routine 200. The routine may be provided by, for example, execution of the CDP system 110 of FIG. 1 or of CDP system 340 of FIG. 3. In this illustrated embodiment, the routine 200 manages various aspects of use of a document provisioning service that provides various functionality and techniques described herein related to facilitating the creation, storage and provisioning of trusted electronic compliance documents on behalf of various users.

The routine begins at block 202, in which information or a request is received. The routine continues to block 204, in which it is determined whether the received information or request is a request for a trusted electronic compliance document. If so, the routine proceeds to block 206 to determine whether the request specifies a unique trusted electronic compliance document—as opposed, for example, to specifying criteria corresponding to multiple trusted electronic compliance documents that satisfy such criteria. Non-limiting examples of such specified criteria may include trusted electronic compliance document type, title, or other identifying criteria; one or more originators that may be associated with multiple trusted electronic compliance documents; one or more requesters that may be associated with multiple trusted electronic compliance documents; geographical region or designation; etc. In at least some embodiments, the CDP system may enable one or more users to browse at least a portion of the trusted electronic compliance document database without specifying particular criteria.

In one or more embodiments, the search results provided based on specified criteria may be limited in accordance with privacy restrictions or other preferences of users associated with such search results. For example, originators and requesters may designate some or all trusted electronic compliance documents associated with such users as private, indicating that only those users specifically designated by such originators and/or requesters may view or otherwise access such trusted electronic compliance documents. As another example, originator and requester users may "opt-out" entirely, indicating that no trusted electronic compliance documents associated with the corresponding user account are viewable or otherwise accessible by users other than those specifically designated by the associated originator or requester. In certain embodiments, the CDP system 110 may operate in an "opt-in" manner, indicating that trusted electronic compliance documents associated with originator and requester users will not be made part of publicly accessible search results unless such originator and requester users specifically choose to make their trusted electronic compliance documents accessible in that manner.

If in block 206 it was determined that the received request specifies a system-wide unique trusted electronic compliance document, the routine proceeds to block 210 to determine whether the specified trusted electronic compliance document is within the database of trusted electronic compliance documents maintained by the CDP system 110. If so, the routine proceeds to block 212 in order to determine whether the CDP system database includes all of the information required to complete the specified trusted electronic compliance document. If additional information is needed in order to complete the specified trusted electronic compliance document, the routine proceeds to block 214 and requests the additional information from the requesting user. In at least some embodiments, the requesting user may provide the additional information themselves or provide an indication of another user or party from whom the CDP system is to request the additional information.

Once the CDP system 110 determines that it has sufficient information required to complete the specified trusted electronic compliance document (whether initially or as a result of requesting additional information), the routine proceeds to block 216, in which an electronic copy of the specified trusted electronic compliance document is modified to include all requisite information. In various scenarios, this may include modifying the electronic copy of the specified trusted electronic compliance document to include information regarding an originator associated with the specified trusted electronic compliance document, a party requesting the specified trusted electronic compliance document (whether an account-holding user of the CDP system 110 or otherwise), and other information referenced by the trusted electronic compliance document itself. As non-limiting examples, the trusted electronic compliance document may reference information regarding a geographical area; insurance policy information; taxation information; business and/or business compliance information (such as the names of corporate officers or other entities); information regarding entities to which the trusted electronic compliance document may later be provided as evidence of compliance; or other appropriate information.

In certain embodiments, as part of provisioning the specified trusted electronic compliance document, the CDP system 110 may validate a transaction-specific code generated for the originator by the CDP system 110 and provided from the originator to a requester of the trusted electronic compliance document. In this manner, the CDP system 110 may ensure that the specified trusted electronic compliance document is provided only to a requester user authorized by the originator of the trusted electronic compliance document. Such codes may be provided to the originator in various manners, such as by electronic mail or other digital communication internal or external to the CDP system 110, postal mail, facsimile, or other appropriate manner. In addition, as discussed elsewhere herein, in various scenarios and embodiments a trusted electronic compliance document originator or other user may selectively determine whether to accept or decline a particular trusted electronic compliance document that has been transmitted for their use by other parties via the CDP system.

If in block 210 it was determined that the specified trusted electronic compliance document is not currently stored within the database of trusted electronic compliance documents maintained by the CDP system 110, the routine proceeds to block 220 in order to determine whether a trusted electronic compliance document originator user associated with the specified trusted electronic compliance document is registered as an account holder of the CDP system 110. If the associated originator is so registered, the routine proceeds to block 222, in which a request for the specified trusted electronic compliance document is sent to the associated originator. In various embodiments and scenarios, such a request may be sent in various manners, including by electronic mail or other digital communication, telephone, internal messaging provided by the CDP system 110 for its users. The request may further include additional information regarding the requester user or other party currently requesting the specified trusted electronic compliance document, regarding the specified trusted electronic compliance document itself, or other information. In addition, the request may include electronic hyperlinks, authentication information, or other information facilitating the creation of the specified trusted electronic compliance document by the target originator user. For example, the request may include a hyperlink that directs the originator to a secure portal that allows the originator to provide information defining the specified trusted electronic compliance document, as described elsewhere herein.

If in block 220 it was determined that the originator associated with the specified trusted electronic compliance document is not registered as a user of the CDP system 110, the routine proceeds to block 224, in which an invitation or other request is sent to the originator to register as a user. Such invitation may include electronic hyperlinks, authentication information, or other information facilitating the registration of the associated originator, and in addition may include information facilitating the creation of the specified trusted electronic compliance document by the originator, such as that described above with respect to block 222.

If it was determined in block 204 that the received information or request was not a request for a trusted electronic compliance document, the routine proceeds (with reference to FIG. 2B) to block 230, in which it is determined whether the incoming information or request is a request for user information. If so, the routine proceeds to block 232, in which information regarding the identified user or users is provided in accordance with authorization settings for those identified users. For example, the identified users may limit the extent to which such users' information is viewable or otherwise accessible based on restrictions or other preferences of those users. For example, originators and requesters may "opt-out" of being publicly listed by the CDP system 110, indicating that only other users that are specifically designated by the associated originator or requester may view some or all of the information associated with that originator or requester. Moreover, in certain embodiments and scenarios, the CDP system 110 may operate in an "opt-in" manner, either with respect to some or all of its users, such that originator and requester users will not be made part of publicly accessible search results unless such originator and requester users specifically choose to do so. In various embodiments, the CDP system 110 may allow users to request an invitation from a known originator, even in circumstances in which that originator and associated trusted electronic compliance documents are not currently viewable or accessible to the requesting user. In such situations, the CDP system 110 may initiate sending an indication of the request to the corresponding originator in various manners (e.g., electronic messaging or other digital communications either internal or external to the CDP system, postal mail, facsimile, etc.).

If in block 230 it was determined that the received information or request was not a request for user information, the routine proceeds to block 234 in order to determine whether the CDP system 110 has received a request to provide defining information for (i.e., to create) a trusted electronic compliance document. If so, the routine proceeds to block 236, in which the originator requesting to define the trusted electronic compliance document is authenticated, and thereafter to block 238, in which the authenticated originator is directed to a secure interface for creation of the indicated trusted electronic compliance document. In at least some embodiments, the secure interface provided by the CDP system 110 may include one or more graphical user interfaces ("GUIs") in order to facilitate the definition of the new trusted electronic compliance document (such as may be provided by Web server 120 of FIG. 1, or by a CDP system application executing on a client device of the user), and may further include various means to accept existing information as part of such definition. For example, the CDP system 110 may accept existing files using graphical or document formats (such as PDF, TIFF, JPEG, or other formats) to be uploaded to the CDP system 110 as part of the trusted electronic compliance document definition process. In at least some embodiments and scenarios, the CDP system 110 may automatically modify such files for facilitating future use of the defined trusted electronic compliance document by the CDP system 110 or users, such as to perform one or more automated operations to include one or more types of modifiable data fields within the defined trusted electronic compliance document. In certain embodiments, the CDP system 110 may accept XML, HTML, or other markup languages as part of the indicated trusted electronic compliance document definition, and may facilitate the trusted electronic compliance document originator in establishing form mappings and document-specific preferences regarding data structures or data fields to be associated with the trusted electronic compliance document.

In addition, the CDP system 110 may include or otherwise utilize one or more methods of authentication as part of the trusted electronic compliance document definition, such as providing methods of digitally signing individual instances of trusted electronic compliance documents that are based on the defined trusted electronic compliance document.

In certain embodiments, the CDP system 110 may retrieve some or all of a trusted electronic compliance document definition from a government agency or other publicly accessible database, such as via one or more modules intended for such retrieval (e.g., "scrapers"). For example, the CDP system 110 may retrieve various tax forms from the United States Internal Revenue Service. In at least one embodiment, the CDP system 110 may perform various operations to include or facilitate the inclusion of modifiable fields and authentication methods with respect to the provision of such tax forms for users of the CDP system 110.

Once the trusted electronic compliance document has been defined by the CDP system 110 in conjunction with information provided by the originator associated with that trusted electronic compliance document, the routine proceeds to block 240, in which information defining the trusted electronic compliance document is stored for future use. In certain embodiments, the CDP system 110 may perform one or more validation processes to the defined trusted electronic compliance document prior to enabling the trusted electronic compliance document to be utilized by originator or requester users. As one example, the CDP system may analyze existing entries and/or include additional entries regarding the trusted electronic compliance document within one or more centralized or distributed secure modification ledgers. As another example, some or all trusted electronic compliance documents used within the CDP system may be validated at the time such trusted electronic compliance documents are provisioned, such that both the underlying document and its specific contents are validated prior to the completed trust electronic compliance document being provided to one or more users of the CDP system.

If it was determined in block 234 that the received information or request was not a request to define a trusted electronic compliance document, the routine proceeds to block 242, in which the received user information or preferences are evaluated. In block 244, the routine determines whether the received user information or preferences are associated with one or more existing user accounts of the CDP system 110. If so, the routine proceeds to block 246, in which the received information or preferences are stored for future use with respect to the associated user account(s). In at least some embodiments, the CDP system 110 may separately determine whether the provider of the received information or request is authorized to provide information with respect to the associated user accounts (such as verifying that the providing user is the account holder, or similar authorization and authentication process).

If the received user information or preferences are not associated with any existing user account, the routine proceeds to block 248, in which it is determined whether the user providing the information or preferences wishes to create a new user account within the CDP system 110. If so, the routine proceeds to block 250, in which a new user account is created in association with the user providing the information and/or preferences, and then to block 246, in which the received information and/or preferences are stored for future use with respect to the newly created user account.

If it was determined in block 248 that the provider of the received information or preferences does not wish to create a user account within the CDP system 110, the routine proceeds to block 252, in which it is determined whether the received information or preferences are being provided for use in provisioning a currently indicated trusted electronic compliance document. If so, the routine proceeds to block 254, in which the CDP system 110 provisions the indicated trusted electronic compliance document using (at least in part) the provided information. For example, such scenario may arise when a party wishes to supply information regarding a trusted electronic tax exemption certificate or other trusted electronic compliance document for a user of the CDP system 110, but does not wish to become a registered user of the CDP system 110. In such circumstances, the CDP system 110 may nonetheless provision the indicated trusted electronic compliance document by modifying a copy of the trusted electronic compliance document to include the information provided by that non-user, either for use by another user of the CDP system 110 or for some other entity. The routine proceeds to block 256, in which the provided information is optionally stored for future use, such as if the CDP system 110 determines to store address or other information associated with a non-user of the CDP system 110.

If it was determined in block 252 that the information or preferences are not being provided for use in provisioning a currently indicated trusted electronic compliance document, the routine proceeds to block 260, in which the provided information is disregarded. In certain embodiments, the CDP system 110 may provide one or more notifications to the provider of the received information, either indicating that the received material will be disregarded or providing instructions for providing the information to the CDP system 110 in a manner which will allow the information to be accepted and stored.

After blocks 208, 218, 222, 224, 232, 240, 246, 256, or 260, the routine continues to block 295 to determine whether to continue, such as until an explicit indication to terminate is received. If it is determined to continue, the routine returns to block 202 in order to await the receipt of another request or additional information, and otherwise continues to block 299 and ends.

Figure 3:
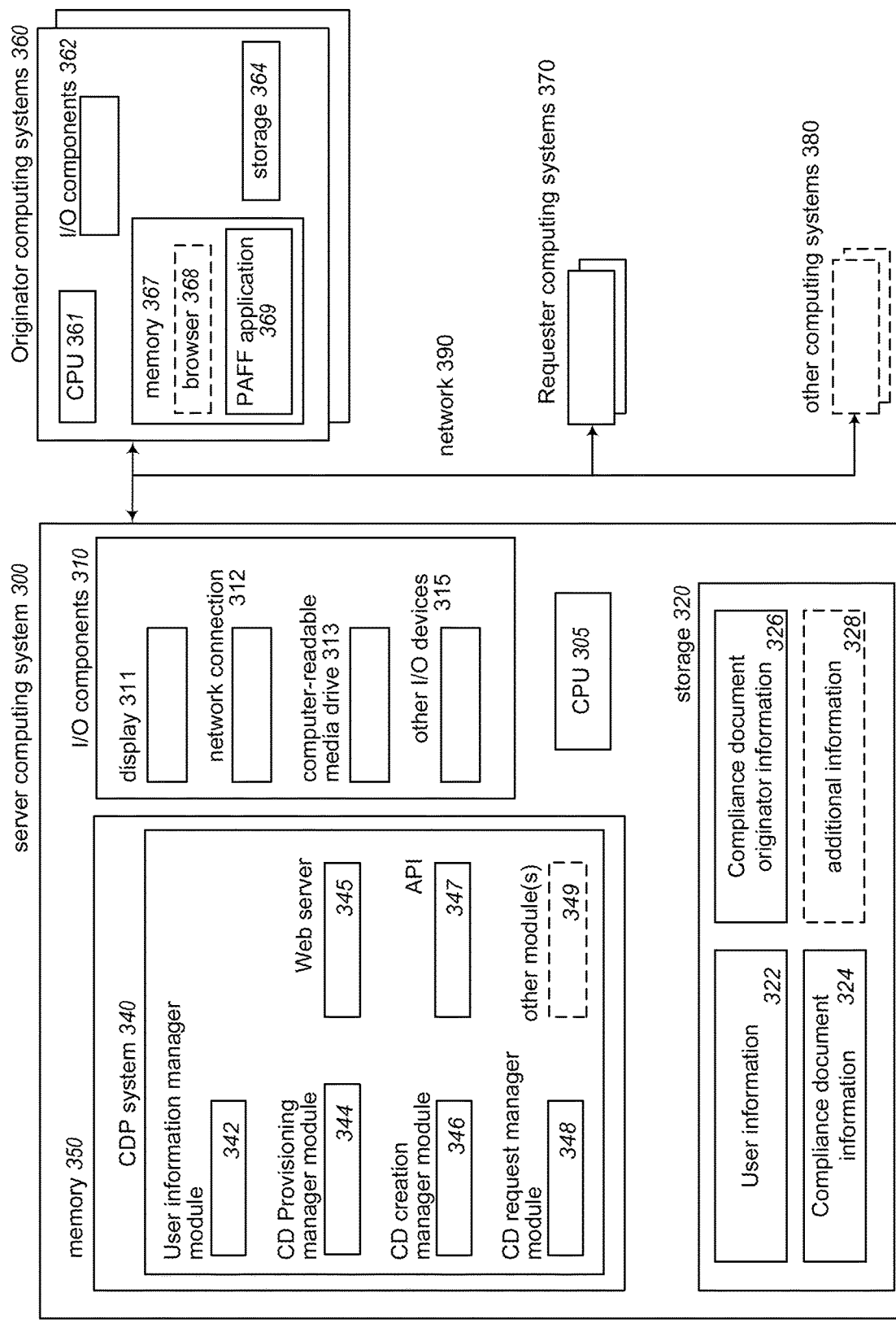
FIG. 3 is a block diagram illustrating component-level functionality provided by a plurality of electronic circuits that, when in combined operation, are suitable for performing and configured to perform at least some of the techniques described herein.

FIG. 3 is a block diagram illustrating component-level functionality provided by a plurality of electronic circuits that, when in combined operation, are suitable for performing and configured to perform at least some of the techniques described herein. In the particular embodiment depicted, the plurality of electronic circuits is at least partially housed within a server computing system 300 executing an embodiment of a CDP system 340. The server computing system 300 includes one or more central processing units ("CPU") or other processors 305, various input/output ("I/O") components 310, storage 320, and memory 350, with the illustrated I/O components including a display 311, a network connection 312, a computer-readable media drive 313, and other I/O devices 315 (e.g., keyboards, mice or other pointing devices, microphones, speakers, GPS receivers, etc.). The server computing system 300 and CDP system 340 may communicate with other computing systems via one or more networks 390 (e.g., the Internet, one or more cellular telephone networks, etc.), such as originator computing systems 360, requester computing systems 370, and other computing systems 380. Some or all of the other computing systems may similarly include some or all of the types of components illustrated for server computing system 300 (e.g., to have a CDP system client application 369 executing in memory 367 of an originator computing system 360 in a manner analogous to CDP system 340 in memory 350).

In the illustrated embodiment, an embodiment of the CDP system 340 executes in memory 350 in order to perform at least some of the described techniques, such as by using the processor(s) 305 to execute software instructions of the system 340 in a manner that configures the processor(s) 305 and computing system 300 to perform automated operations implementing those described techniques. As part of such automated operations, the system 340 and/or other optional programs or modules 349 executing in memory 330 may store and/or retrieve various types of data, including in the example database data structures of storage 320. In this example, the data used may include various types of user information in database ("DB") 322, trusted electronic compliance document information in DB 324, trusted electronic compliance document originator information in DB 326, and/or various types of other information in DB 328, such as various regulatory or policy information related to one or more trusted electronic compliance documents or originator users of the CDP system.

It will be appreciated that computing system 300 and computing systems 360 and 370 are merely illustrative, and are not intended to limit the scope of the present invention. The systems may instead each include multiple interacting computing systems or devices, and may be connected to other devices that are not specifically illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable and other user tracking devices, biometric monitoring devices, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDP system 340 may in some embodiments be distributed in various modules. Similarly, in some embodiments, some of the functionality of the CDP system 340 may not be provided and/or other additional functionality may be available. When so arranged as described herein, each computing device may be transformed from a generic and unspecific computing device to a combination device comprising hardware and software configured for a specific and particular purpose.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the CDP system 340 and/or CDP client software executing on computing systems 360 and/or 370) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a trusted electronic compliance document disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

The descriptions of the various techniques disclosed herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments and techniques disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (compliance document-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions. Such computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform operations related to the described functionality, or carry out combinations of special purpose hardware and computer instructions.

According to at least one embodiment, a system for providing a document provisioning service comprises a compliance member database component (e.g., user information DB 134, compliance document originator DB 136, or the like) that, in operation, maintains data regarding trusted electronic compliance document originators. The system further includes a trusted electronic compliance document creation portal that is communicatively coupled to the compliance member database component and to the trusted electronic compliance document database (e.g., compliance document DB 132) and that, in operation, facilitates creation of trusted electronic compliance documents by trusted electronic compliance document originators. Each trusted electronic compliance document references information regarding one or more parties to a potential transaction and confers at least partial eligibility to participate in the potential transaction for at least one of the one or more parties. The system further includes a trusted electronic compliance document request manager that is communicatively coupled to the trusted electronic compliance document database component and the compliance member database component, and that, in operation, receives a user request for an indicated trusted electronic compliance document and determines whether the user request is directed to one or more of the maintained plurality of trusted electronic compliance documents. The system further includes a trusted electronic compliance document generator that is communicatively coupled to the trusted electronic compliance document request manager and that in operation, when it is determined that the indicated trusted electronic compliance document is one of the maintained plurality of trusted electronic compliance documents, provides access to the indicated trusted electronic compliance document in response to the received user request. Providing access to the indicated trusted electronic compliance document includes modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document. In operation, when it is determined that the user request is not directed to one or more of the maintained plurality of trusted electronic compliance documents, the trusted electronic compliance document request manager provides a secure interface for creation of the indicated trusted electronic compliance document via the trusted electronic compliance document creation portal.

According to another embodiment, a method implemented by one or more computing systems of a document provisioning service comprises receiving multiple user requests that each indicate a trusted electronic compliance document. Each trusted electronic compliance document references information regarding one or more parties to a potential transaction and confers at least partial eligibility to participate in the potential transaction for at least one of the one or more parties. The method further comprises responding to each of at least some of the multiple user requests by determining whether the user request is directed to one of a plurality of trusted electronic compliance documents maintained by the document provisioning service and, when it is determined that the user request is directed to one of the plurality of trusted electronic compliance documents maintained by the document provisioning service, providing access to the indicated trusted electronic compliance document. Providing access to the indicated trusted electronic compliance document includes modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document. The method further comprises, when it is determined that the user request is not directed to one of the plurality of trusted electronic compliance documents maintained by the document provisioning service, providing a secure interface for creation of the indicated trusted electronic compliance document by one or more trusted electronic compliance document originators.

According to another embodiment, a non-transitory computer-readable storage medium has stored contents that, when executed, configures a computing system to perform a method. The method comprises receiving multiple user requests that each indicate a trusted electronic compliance document. Each trusted electronic compliance document references information regarding one or more parties to a potential transaction and confers at least partial eligibility to participate in the potential transaction for at least one of the one or more parties. The method further comprises, for each of at least some of the multiple user requests, determining whether the user request is directed to one of a plurality of trusted electronic compliance documents maintained by the document provisioning service. The method further comprises, when it is determined that the user request is directed to one of the plurality of trusted electronic compliance documents maintained by the document provisioning service, modifying a copy of the indicated trusted electronic compliance document to include at least some information referenced by the indicated trusted electronic compliance document with respect to one or more of a group that includes an entity associated with the user request and a trusted electronic compliance document originator associated with the indicated trusted electronic compliance document, and providing access to the modified copy of the indicated trusted electronic compliance document. The method further comprises, when it is determined that the user request is not directed to one of the plurality of trusted electronic compliance documents maintained by the document provisioning service, providing a secure interface for creation of the indicated trusted electronic compliance document by one or more trusted electronic compliance document originators.

According to another embodiment, a system comprises one or more processors and at least one memory, the memory including instructions that, upon execution by at least one of the one or more processors, cause the system to receive from a user an indication of a trusted electronic compliance document, the indicated trusted electronic compliance document referencing information regarding one or more parties to a potential transaction and imparting at least partial eligibility to participate in the potential transaction to at least one of the one or more parties. The instructions further cause the system to generate a request for the indicated trusted electronic compliance document, and to provide, via a programmatic interface communicatively coupled to a trusted electronic compliance document source (e.g., a compliance document DB 132), the generated request for the indicated trusted electronic compliance document. The instructions further cause the system to, after receiving a copy of the indicated trusted electronic compliance document from the trusted electronic compliance document source, modify the copy of the indicated trusted electronic compliance document based at least in part on data maintained by a compliance provisioning service to include at least some of the referenced information regarding the one or more parties to the potential transaction, and provide access to the modified copy of the trusted electronic compliance document to the user.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system for providing a document provisioning service, comprising:
   a member database that, in operation, maintains data regarding trusted electronic document originators;
   a trusted electronic compliance document database that, in operation, maintains on behalf of the trusted electronic document originators a plurality of trusted electronic documents that include information associated with parties to transactions and potential transactions;
   a trusted electronic document creation portal that is communicatively coupled to the member database and to the trusted electronic document database and that, in operation, facilitates creation of at least some of the plurality of trusted electronic documents by at least some trusted electronic document originators, wherein a given trusted electronic document references information regarding one or more parties to a potential transaction and confers at least partial eligibility to participate in the potential transaction for at least one of the one or more parties only after the at least one of the one or more parties provides the information referenced by the trusted electronic document and the trusted electronic document is modified to include the provided information;
   a trusted electronic document request manager that is communicatively coupled to the trusted electronic document database and that, in operation, receives a user request for an indicated trusted electronic document and determines whether the user request is directed to one or more of the maintained plurality of trusted electronic documents; and
   a trusted electronic document generator that is communicatively coupled to the trusted electronic document request manager and that in operation, when it is determined that the indicated trusted electronic document is one of the maintained plurality of trusted electronic documents, provides access to the indicated trusted electronic document in response to the received user request, wherein providing access to the indicated trusted electronic document includes modifying a copy of the indicated trusted electronic document to include at least some information referenced by the indicated trusted electronic document prior to the modification with respect to one or more of a group that includes an entity associated with the user request and a trusted electronic document originator associated with the indicated trusted electronic document;
   wherein, in operation, the trusted electronic document request manager provides, in response to the trusted electronic document request manager determining that the user request is not directed to one or more of the maintained plurality of trusted electronic documents, a secure interface for creation of the indicated trusted electronic document via the trusted electronic document creation portal, wherein providing the secure interface for creation of the indicated trusted electronic document includes:

transmitting an electronic invitation over one or more computer networks to one or more trusted electronic document originators for use of the trusted electronic document creation portal; and after transmitting the electronic invitation to the one or more trusted electronic document originators, receiving, via a software application that is associated with the document provisioning service and that is executing on a client computing device of the one or more trusted electronic document originators, information, including an image file that at least partially defines the indicated trusted electronic document from at least one of the one or more trusted electronic document originators.

2. The system of claim 1, wherein the indicated trusted electronic document is one of a group that includes a tax exemption certificate, a tax withholding form, an excise license, a business license, and a certificate of insurance.

3. The system of claim 1, wherein the user request is received by the trusted electronic document request manager via a software application executing on a client computing device of a user associated with the user request.

4. The system of claim 1 wherein providing access to the indicated trusted electronic document further includes determining whether the modified copy of the indicated trusted electronic document is completed and, when it is determined that the modified copy of the indicated trusted electronic document is completed, forwarding the modified copy of the indicated trusted electronic document to one or more entities associated with the potential transaction.

5. A system, comprising:
one or more processors; and
at least one memory, the memory including instructions that, upon execution by at least one of the one or more processors, cause the system to:
receive from a user an indication of a trusted electronic document, the indicated trusted electronic document referencing information regarding one or more parties to a potential transaction and imparting at least partial eligibility to participate in the potential transaction to at least one of the one or more parties;
generate a request for the indicated trusted electronic document;
provide, via a programmatic interface communicatively coupled to a trusted electronic document source, the generated request for the indicated trusted electronic document;
after receiving a copy of the indicated trusted electronic document from the trusted electronic document source, modify the copy of the indicated trusted electronic document based at least in part on data maintained by a provisioning service to include at least some of the referenced information regarding the one or more parties to the potential transaction, wherein the information regarding the one or more parties to the potential transaction was referenced by the indicated trusted electronic document prior to the modification; and
provide access to the modified copy of the trusted electronic document to the user.

6. The system of claim 5, wherein the instructions that, upon execution by at least one of the one or more processors, further cause the system to:

maintain data regarding regulatory or other information regarding multiple jurisdictions with respect to each of multiple types of trusted electronic documents;

associate appropriate factors for each type of trusted electronic document for each of the multiple jurisdictions based on the data regarding regulatory or other information regarding multiple jurisdictions;

after receiving a copy of the indicated trusted electronic document from the trusted electronic document source and before the providing access to the modified copy of the trusted electronic document to the user, complete modification of the copy of the indicated trusted electronic document according to additional information indicated by a factor associated with the indicated trusted electronic document based on the associated appropriate factors for each type of trusted electronic document for each of the multiple jurisdictions.

7. The system of claim 6 wherein the indicated trusted electronic document does not expressly reference the information indicated by the factor associated with the indicated trusted electronic document.

8. The system of claim 6 wherein the information indicated by the factor associated with the indicated trusted electronic document is regarding a reason or class for tax-exempt status for one or more of the potential transaction and the one or more parties that is allowed by a jurisdiction to which the indicated trusted electronic document is applicable.

9. A system, comprising:
one or more processors; and
at least one memory, the memory including instructions that, upon execution by at least one of the one or more processors, cause the system to:
receive information from a user;
determine whether the received information is a request for a trusted electronic compliance document;
in response to a determination that the information is not a request for a trusted electronic compliance document, determine whether the received information is a request for user information;
in response to a determination that the information is not a request for user information, determine whether the received information is a request to define an indicated trusted electronic document; and
in response to a determination that the information is a request to define an indicated trusted electronic document:
authenticate an originator requesting to define the trusted electronic document;
direct the authenticated originator to a secure interface for creation of the indicated trusted electronic document;
accept an existing file in a graphical document format;
automatically modify the existing file for facilitating future use of the existing file by including in the existing file one or more types of modifiable data fields within existing file; and
automatically establish form mappings and document-specific preferences of the document originator regarding data structures or data fields to be associated with the existing file to define the indicated trusted electronic document.

10. The system of claim 9 in which the instructions, upon execution by at least one of the one or more processors, further cause the system to:
receive additional information from the user;

determine whether the received additional information is a request for a trusted electronic compliance document;

in response to a determination that the information is a request for a trusted electronic compliance document, determine whether the request specifies a unique trusted electronic document and is not specifying criteria corresponding to multiple trusted electronic documents that satisfy particular criteria;

in response to a determination that the request specifies a unique trusted electronic document and is not specifying criteria corresponding to multiple trusted electronic documents that satisfy particular criteria, determine whether the specified trusted electronic document is within a database of trusted electronic compliance documents;

in response to a determination that the specified trusted electronic document is not within the database of trusted electronic compliance documents, determine whether a trusted electronic document originator user associated with the specified trusted electronic document is registered as an account holder of a system maintaining the database of trusted electronic compliance documents; and in response to a determination that the trusted electronic document originator user associated with the specified trusted electronic document is not registered as an account holder of a system maintaining the database of trusted electronic compliance documents, send an invitation to the trusted electronic document originator user associated with the specified trusted electronic document to register as a user, in which the invitation includes electronic hyperlinks, authentication information, or other information facilitating the registration of the associated originator, and in addition includes information facilitating the creation of the specified trusted electronic compliance document by the associated originator.

11. The system of claim 1 in which the trusted electronic document is a certificate and the eligibility that the trusted electronic document confers is eligibility for the at least one of the one or more parties to be exempt from one or more items regarding the potential transaction.

* * * * *